Nov. 18, 1969   TATSUO TANAKA ETAL   3,478,599
MEASURING METHOD OF THE PARTICLE SIZE FOR POWDER AND GRAIN
Filed Sept. 28, 1966   2 Sheets-Sheet 1

INVENTORS
Tatsuo Tanaka
Keishi Gotoh
BY Hiroshi Kajiura
James F. Montague
Attorney

3,478,599
MEASURING METHOD OF THE PARTICLE SIZE FOR POWDER AND GRAIN

Tatsuo Tanaka, 23 of 402-Tou, 373, Nakanoshima, Sapporo-shi, Japan; Keishi Gotoh, 1, 2-chome, Ashibemachi, Kita-ku, Nagoya-shi, Japan; and Hiroshi Kajiura, c/o Dengen Automation Kabushiki Kaisha, 24, 1-chome, Miyazono-dori, Nakano-ku, Tokyo, Japan
Filed Sept. 28, 1966, Ser. No. 582,703
Int. Cl. G01n *33/00*
U.S. Cl. 73—432                      5 Claims

ABSTRACT OF THE DISCLOSURE

In a method of continuously measuring particle size in a classification device a stream of particles to be measured is fed continuously into an elutriator, where the stream of particles is continuously divided into a fine particle flow stream and a coarse particle flow stream by passing a continuous air flow through the elutriator. Then by controlling the air flow so that the ratio of the flow rates of the two streams is constant and by measuring the air flow, a continuous determination of the size of the particles in the feed stream is made.

---

The present invention relates to a measuring method of the particle size for powder and grain.

It is one object of the present invention to measure the particle size of powder and grain continuously and accurately by a consistent system.

With this and other objects in view, which will become apparent in the following detailed description, the present invention will be clearly understood in connection with the accompanying drawings, in which.

Figure 1:
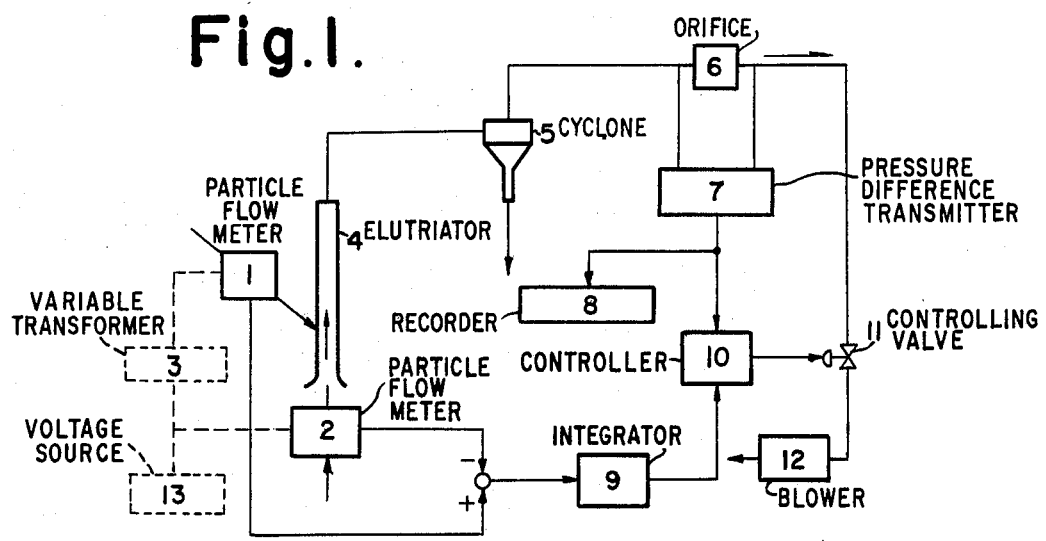
FIGURE 1 is a schematic diagram of the apparatus permitting the performance of the present invention.

For measuring particle size, numerous devices have been in use, such as a shifter, Andreasen pipette, a sedimentation balance, a light transmission device (micron photo sizer) and an elutriator. However all these devices have a common drawback, namely they cannot continuously measure the particle size by a consistent system.

In particle processing it is indispensable to measure the particle size continuously and to control it from the point of view of automatic processing and rationalization.

The present invention avoids the above stated drawback. The principle applied in accordance with the present invention resides in the use of a classification device, in which the separated particle diameter is clearly defined by a controlled or manipulated variable. For example, an elutriator is used to divide the supplied particle flow into two portions and the particle diameter of the supplied particle flow is measured by measuring the manipulated variable, or the air velocity of the elutriator is adjusted such that the ratio of the two flow rates becomes constant.

Thus the particle diameter corresponding to the constant separated weight percentage is obtained and the particle diameter is defined as the supplied particle diameter.

Referring now to the drawings, different devices are disclosed by example, which permit performance in accordance with the present invention.

FIG. 1 discloses a continuous elutriator 4 operatively connected with a cyclone 5, the rear side of which has an orifice 6. A manipulated variable, namely, the air velocity in the elutriator 4 is measured by the orifice 6 at the rear side of the cyclone 5.

Particle flow meters 1 and 2 are arranged in the unit for measuring the inlet flow rate, as well as the outlet flow rate, respectively between which flow meters the particles are fed.

The total inlet flow rate of the particles $F_{in}$ (g./sec.) is detected by the particle flow meter 1 and converted to an electric signal $E_{in}$.

The outlet particle flow rate from the continuous elutriator 4 disposed at the side of the coarse particle stream (defined as the tailing stream) $F_{out}$ (g./sec.), is detected by the flow meter 2 and converted to an electric signal $E_{out}$.

A variable transformer 3 (or variac) is also provided for multiplying the sensitivity of the particle flow meter by $Rs$ ($\leq 1$), and $Rs$ becomes the preset value of the separated weight percentage of the elutriator 4.

If the velocity of the air in the elutriator 4 is controlled to satisfy the following equation, $$\Delta E f = E_{in} - E_{out} = Rs \cdot K \cdot F_{in} - K \cdot F_{out} = 0$$

wherein K is the sensitivity of the flow meters 1 and 2, the following equation results:

$$KF_{out}/KF_{in} = F_{out}/F_{in} = Rs$$

Accordingly, in order to make the flow rate ratio constant between the separated two particle stream portions in the continuous elutriator 4, it is sufficient to control the air flow velocities, so as to satisfy the following equation:

$$\Delta E f = 0$$

In this example, the air velocity in the continuous elutriator 4 is controlled by the orifice 6, and also by a pressure difference transmitter 7, operatively connected therewith, a controller 10 and a controlling valve 11, and in order to cause the preset value to move in a suitable direction and to obtain the relation of $\Delta E f = 0$, the difference of the electric signals of the flow meters 1 and 2 is fed to an integrator 9 and the output of the latter to a controller 10.

Between the pressure difference transmitter 7 and the controller 10 is disposed a recorder 8; a blower 12 is controlled by the controlling valve 11, to blow inside the elutriator 4.

An A.C. 100 v. electric source 13 feeds the primary circuit of the variable transformer 3.

The result obtained by the method set forth above will be described in FIGS. 2 to 4.

Figure 2:
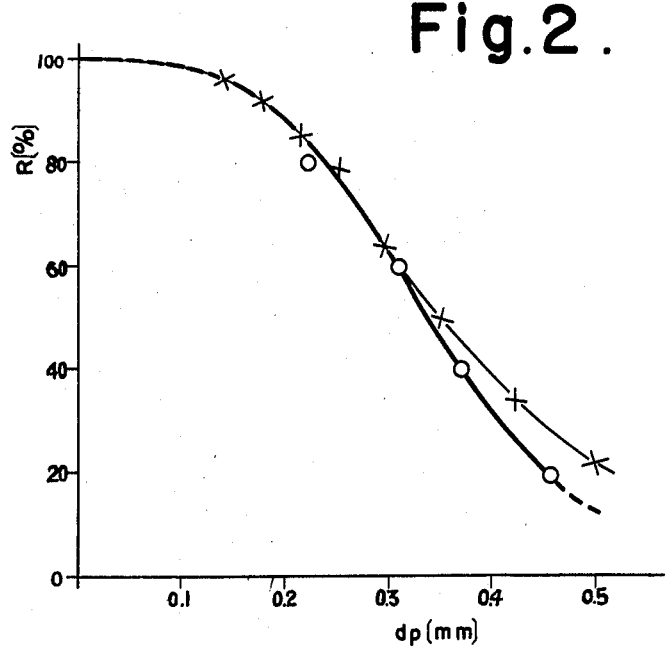
FIG. 2 is a diagram depicting the result of size measurement for sand grain of 0.1 mm. to 0.5 mm. diameter.

FIG. 2 depicts the result of the method using sand particles of 0.1–0.5 mm. diameter, in this case the particles are not of perfect sphere shape and even if there is some deviation between the result of actual measurement, using a screening or sieve (as indicated by the x marks) and that of actual measurement using the present method, however, both results coincide substantially with each other.

Figure 3:
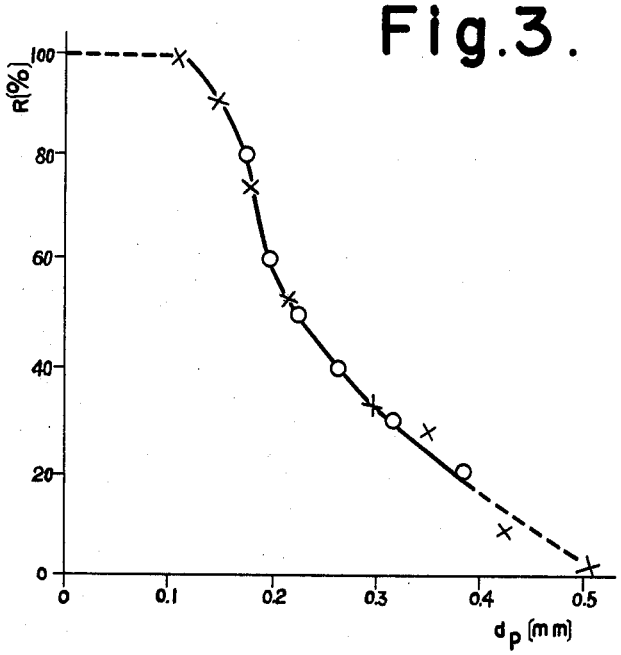
FIG. 3 is a diagram depicting the result of measurement for glass balls, the diameter of which is the same as in FIG. 2.

FIG. 3 depicts the results of the method using glass balls of 0.1 to 0.5 mm. diameter, in which the result coincides well with the result of measurement obtained by the present method, in case the particles are of sphere shape.

Figure 4:
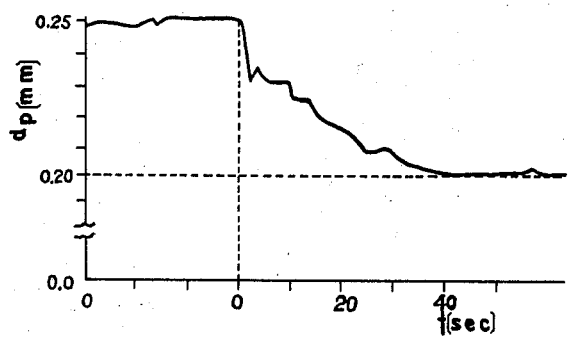
FIG. 4 is a diagram depicting the result of a response test for glass balls.

FIG. 4 depicts the result of the response test performed using the glass sphere or beads at $t$ (sec.)$=0$ and step changing the preset value $Rs$ from 40 to 60%, in this case the shape of the particle diameter distribution curve is not changed and corresponds to the case when 50% mean diameter step changed from 0.25 mm. to 0.20 mm.

FIG. 4 also depicts an example of the response curve and the settling time is about 30 sec., however, settling time around 5 sec. may be available.

While we have disclosed several embodiments of the present invention, it is to be understood that these embodiments are given by example only and not in a limiting sense.

We claim:
1. A method of measuring particle size in a classification device, comprising
   feeding a stream of particles to be measured into an elutriator,
   dividing the stream of particles in the elutriator into a fine particle flow stream and a coarse particle flow stream by passing an air flow through said elutriator,
   controlling said air flow so that the ratio of the flow rates of the fine particle flow stream and the coarse particle flow stream is constant, and
   measuring said air flow thereby providing a measure of the size of said particles in the fed stream.
2. The method, as set forth in claim 1, wherein
   said feeding step is a continuous feeding of a stream of particles to be measured into said elutriator,
   said dividing step is a continuous dividing in said elutriator by passing a continous air flow through said elutriator,
   controlling said air flow continuously, and to maintain said ratio constant, and
   continuously measuring said air flow thereby continuously providing a measure of the size of the particles in the feed stream.
3. The method as set forth in claim 1, wherein
   said measuring step is performed by measuring the air velocity of said air flow.
4. The method as set forth in claim 3, wherein
   said air velocity is measured by an orifice and a pressure difference transmitter.
5. The method as set forth in claim 3, wherein
   said controlling step is accomplished by,
      providing a first and second electrical signal responsive to the flow rates of each of the fine particles flow stream and coarse particle flow stream, respectively, and
      controlling said air flow until the two electrical signals are identical.

References Cited

UNITED STATES PATENTS

| | | | |
|---|---|---|---|
| 2,946,220 | 7/1960 | Cogniat et al. | 73—196 |
| 3,206,983 | 9/1965 | Muschelknautz | 73—432 |
| 3,334,516 | 8/1967 | Cedrone | 73—61 |

LOUIS R. PRINCE, Primary Examiner

JOSEPH W. ROSKOS, Assistant Examiner